(12) United States Patent
Moteki et al.

(10) Patent No.: US 6,541,086 B2
(45) Date of Patent: *Apr. 1, 2003

(54) EASILY TEARABLE PACKING FILMS

(75) Inventors: Yoshiji Moteki, Kitaadachi-gun (JP); Shigeyuki Ohshima, Nakano-ku (JP); Shokichi Yamazaki, Hannou (JP)

(73) Assignee: Hosokawa Yoko Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,943

(22) Filed: Jun. 5, 1998

(65) Prior Publication Data

US 2001/0038895 A1 Nov. 8, 2001

(51) Int. Cl.[7] .......................... B65D 75/06; B65D 75/62
(52) U.S. Cl. .................. 428/35.8; 206/824; 220/62.13; 220/62.22; 229/87.08; 428/36.91; 428/37; 428/43; 428/138; 428/423.1; 493/212; 493/377; 493/930; 493/933; 493/963
(58) Field of Search ................................. 493/930, 933, 493/963, 377, 212; 428/35.7, 35.8, 35.3, 34.8, 36.9, 36.91, 43, 37, 138, 423.1; 220/62.13, 62.22; 426/105, 106, 109, 113, 121, 126, 127

(56) References Cited

U.S. PATENT DOCUMENTS

| | | | | |
|---|---|---|---|---|
| 3,608,815 A | * | 9/1971 | Bunch | 229/66 |
| RE33,880 E | * | 4/1992 | Yamazaki et al. | 383/200 |
| 5,484,631 A | * | 1/1996 | Hoh | 428/2 |
| 5,512,337 A | * | 4/1996 | Littmann et al. | 428/35.4 |
| 5,798,183 A | * | 8/1998 | Hosono et al. | 428/458 |

* cited by examiner

Primary Examiner—Sandra M. Nolan
(74) Attorney, Agent, or Firm—Parkhurst & Wendel, L.L.P.

(57) ABSTRACT

A first embodiment of the packing film is a four-layered laminate film in which the following films are laminated in that order: a first oriented plastic film formed as an outer surface layer and provided with a first coarse surface portion, an aluminum foil or paper sheet, a second oriented plastic film provided with a second coarse surface portion which is overlapped with the first coarse portion, and a non-oriented plastic film formed as an inner surface layer. A second embodiment of the packing film is a three-layered laminate film in which the following films are laminated in that order: an oriented plastic film formed as a first surface layer and provided with a coarse surface portion, an aluminum foil, and a non-oriented plastic film formed as an inner surface layer. The oriented plastic film forming the outer surface layer is backed at its coarse surface portion by a thin surface layer and laminated to the aluminum foil through a binder layer.

9 Claims, 4 Drawing Sheets

DIRECTION FOR CUTTING

EASILY TEARABLE PACKING FILMS

BACKGROUND OF THE INVENTION

The present invention relates to a packing or wrapping film which is provided with an aluminum foil or the like as an intermediate layer and which is hard to break or tear but to easily be openable. The present invention also relates to a packing bag and a package body manufactured by using such packing film.

In a known art, there is provided a packing bag which is manufactured by heat-sealing a composite film formed by laminating a polyethylene film to a cellophane, paper or the like material, and since such packing bag is easily openable by hands along the heat seal portion without using any cutting means, such bag has been widely used. However, such composite film has low rupture strength and, particularly, has an insufficient moisture-proof property, so that there is a limitation to a content to be sealed in the packing bag manufactured by using such composite film.

In order to eliminate such defect, there has also been provided a laminate film, having improved rupture strength and moisture-proof property, formed by combining different kinds of plastic films. Such plastic laminate film has been widely utilized for manufacturing various packing bags, for example, for a material for a package (pouch or bag) or a material for a tubular package for containing sausage, sweet jellied bean-paste or the like.

It is difficult to open by hands the packing bag formed by using the plastic laminate film as a packing material because the plastic laminate film has a certain tearing strength, and in order to easily open such packing bag, a V-shaped or I-shaped notch is formed to the heat-seal portion of the packing bag.

Furthermore, one prior art example of a packing bag manufactured by using the plastic laminate film is shown in U.S. Pat. No. 3,608,815, in which, in order to open the bag from a bent(or folded) portion of the bag, an opening assisting area is formed to the bent portion by penetrating a pin to this bent portion and the bag is opened by hands at the opening assisting area as opening (cut) starting portion.

Still furthermore, the applicant of the subject application has been proposed a packing bag manufactured by using the plastic laminate film. The bag is formed with a bent(or folded) portion from which the bag is openable. In order to facilitate the opening from the bent portion, a plastic laminate film formed by laminating an oriented plastic film having a coarse surface and a non-oriented plastic film having a flat surface is used so that the coarse surface is positioned at the portion of the bag to be bent to open the bag from this bent portion.

However, the prior art techniques mentioned above provide the following defects or drawbacks.

In a case where the packing bag formed with the notch such as the V-shaped notch to the heat seal portion is manufactured by a packing material working maker and then supplied to a user, the notch forming working to the heat seal portion of the packing bag can be done by the working maker at the packing bag forming process, there is no problem for forming the notch to the heat seal portion. However, in a case where the packing material working maker supplies a packing material in roll form to a user and the manufacturing of the packing bag is performed by the user while filling a content in the bag by using a packing machine, it is difficult for the user side to form the notch to the heat seal portion of the packing bag.

Furthermore for the packing bag formed with the opening assisting area at the bent portion by penetrating a pin, it As not necessary to use a jig such as cutter for opening the bag and the bag can be easily opened by hands. However, the formation of the pin penetration hole degrades water-vapor permeability and oxygen permeability as such packing bag. Accordingly, such packing bag is not usable for packing, for example, such a content as coffee powders, rice crackers or the like which will be easily damaged by the moisture, thus limiting contents to be packed, being disadvantageous.

Still furthermore, with the packing bag formed by the plastic laminate film composed of the oriented plastic film having the coarse surface portion and the non-oriented plastic film having the flat surface in a manner such that the coarse surface portion of the oriented plastic film is covered with the flat surface of the non-oriented plastic film, the water-vapor permeability and the oxygen permeability are hardly degraded as the packing bag, so that there is no limitation of thee content to be sealed therein in a shelf-life time period. However, the packing bag of this type is not sufficient for the specific use as a bag capable of substantially completely shutting off moisture and oxygen or for sealing a retort food.

In a view point of reservation of the inner content, it will be preferred to use a laminate film, which is composed of oriented plastic films and an intermediate aluminum foil disposed between these plastic, films, for the material of the packing bag for reserving the inner content for a long term or containing the retort food. However, the packing bag formed of such plastic laminate film is hard to tear, so that it is often difficult to open the bag from the bent portion thereof.

Taking the above matters into consideration, the applicant of the subject application has provided a packing bag suitable for keeping the inner content in a good condition for a long time or for containing the retort food by using a plastic film material which is composed of an oriented plastic film having a coarse surface portion, a non-oriented plastic film having a flat surface, and an aluminum foil or paper sheet disposed between the oriented and non-oriented plastic films.

The laminate film of this structure has a good openability and a good shelf life property. However, in a view point of the shelf life, it is preferred to dispose the aluminum foil between the oriented plastic films.

Moreover, the packing bag formed from She plastic laminate film material with an aluminum foil or paper sheet being interposed between plastic films has a defect such that a value for commercial product is lowered or degraded because of a fear that when the oriented plastic film having the coarse surface portion and the aluminum foil is laminated by using a binder(or an adhesive), a component of the binder may be intruded into through holes formed to the coarse surface portion and leaks to an outer surface of the oriented plastic film. When the binder leaks on the surface of the plastic laminate film, a guide roller guiding the plastic film may be contaminated with the leaked binder when packing bags are continuously manufactured, and furthermore, when the laminated film of the oriented plastic film and the aluminum foil is rolled, a blocking phenomenon may be caused to the rolled continuous laminated film, providing a troublesome problem.

Furthermore, it is generally difficult to tear, by hands, the bonded portion of the tubular package body in which sausage or the like is sealed as an inner content because such package body is required to have a high tearing strength, and hence, it is required to use a jig such as cutter for opening such package body. In this regard, a package body having a heat seal portion from which the package is easily opened by hands has been proposed.

In a package body formed of a plastic laminate film, it is possible to easily open the package by attaching an opening tape having a fine width to the heat seal surface and drawing the opening tape. However, the attaching of the fine tape to the heat seal surface of the package requires an additional working process, which will result in a complicated manufacturing process and a cost increase.

SUMMARY OF THE INVENTION

In view of the defects or drawbacks encountered in the prior art mentioned above, a first object of the present invention is to provide a packing film, which is composed of oriented plastic films laminated on both surfaces of an aluminum foil or paper sheet as an intermediate layer, and further provided with an opening starting portion capable of being easily torn.

A second object of the present invention is to provide a packing film having an oriented plastic film, which is laminated, as a front (or outer) surface layer having a coarse surface portion, on an intermediate layer such as aluminum foil or paper sheet, capable of preventing a binder from leaking through the coarse surface portion even with an opening starting portion being easily torn.

A third object of the present invention is to provide a packing bag having a bent portion manufactured by using the packing film mentioned above and being provided with a good inner content keeping performance and capable of being easily torn from the bent portion.

A fourth object of the present invention is to provide a tubular package body manufactured by using the packing film mentioned above, the package body being provided with an opening starting portion extending in a spiral form formed to a peripheral wall of the tubular package body so as to easily open the body from a portion different from a heat seal portion without making complicated the manufacturing process.

According to the present invention, these and other objects can be achieved by providing the following packing films, packing bags and the package bodies.

In one aspect of the present invention for achieving the above first object, there is provided a packing film comprising:

a first oriented plastic film formed as a first surface layer and provided with a first coarse surface portion;

an aluminum foil or paper sheet formed as a first intermediate layer;

a second oriented plastic film formed as a second intermediate layer and provided with a second coarse surface portion which is to be overlapped with the first coarse portion of the first oriented plastic film when laminated; and a non-oriented plastic film formed as a second surface layer, wherein the first oriented film, the aluminum foil or paper sheet, the second oriented plastic film and the non-oriented plastic film are laminated in this order so as to provide a laminated multi-layer structure, and an overlapped area of the first and second coarse surface portions constitutes an area to be opened.

In the usual structure, the oriented plastic films are laminated to both surfaces of the aluminum foil or paper sheet, so that a relatively large tearing force is required for starting the tearing of the packing film. However according to the structure of the above aspect, the first and second coarse surface portions formed to the first and second oriented plastic films are formed to be overlapped with each other, so that the plastic film can be torn with a relatively weak force when torn from the area to be opened.

In another aspect of the present invention for achieving the second object, there is provided a packing film comprising:

an oriented plastic film formed as a first surface layer and provided with a coarse surface portion;

an aluminum foil or paper sheet formed as an intermediate layer; and a non-oriented plastic film formed as a second surface layer, wherein the oriented plastic film, the aluminum foil or paper sheet and the non-oriented plastic film are laminated in this order so as to provide a multi-layer structure, and wherein the coarse surface portion of the oriented plastic film is backed by a thin film layer, the oriented plastic film is laminated to the intermediate layer through a binder layer, and the coarse surface portion constitutes an area to be opened.

Furthermore, there is also provided a packing film comprising:

an oriented plastic film formed as a first surface layer and provided with a coarse surface portion;

an aluminum foil or paper sheet formed as an intermediate layer; and a non-oriented plastic film formed as a second surface layer, wherein the oriented plastic film, the aluminum foil or paper sheet and the non-oriented plastic film is laminated in this order so as to provide a multi-layer structure, and wherein the oriented plastic film is laminated to the intermediate layer through a binder having a large amount of solid components and the coarse surface portion constitutes an area to be opened.

According to the structures of this aspect, the binder is prevented from intruding into the coarse surface portion by backing the coarse surface portion of the oriented plastic film with the thin film layer. In addition, when the oriented plastic film is laminated through the binder having a large amount of solid components, the intrusion of the binder is also prevented without backing.

In a further aspect of the present invention for achieving the third object, there is provided a packing bag which is formed by using the plastic films of the structures mentioned above. The packing bag is formed by bending(or folding) a rectangular packing film into a tubular body, by heat sealing side end portions of the bent packing film as a bonded side portion of the tubular body and by heat sealing both end openings of the tubular body so that the non-oriented plastic film constitutes an inner surface layer when formed as the tubular body of the packing bag with the course surface portion positioned to a bent(or folded) portion of the bag body.

In preferred examples, the second oriented plastic film as the second intermediate layer is formed of a non-polar plastic film material. The second oriented film as the second intermediate layer has one surface facing the first intermediate layer and another surface facing the non-oriented plastic film and the one and another surfaces of the second intermediate layer are subjected to a corona treatment. The non-oriented plastic film forming the inner surface layer has a surface facing the second oriented plastic film, the surface being subjected to a corona treatment.

According to such packing bag, since the bent portion formed as the area to be opened serves as a portion from which the tearing is started, the tearing can be easily done with relatively weak force.

In a still further aspect of the present invention for achieving the fourth object, there is provided a package body formed by bending a rectangular packing film having a predetermined dimension so as to provide a tubular body, heat sealing both side end portions of the bent packing film as a bonded side portion and closing both opening end portions of the tubular body, the packing film having the structure mentioned above, and an area of the course surface portion constitutes an area to be opened, the area to be opened extending in a linear spiral shape on an outer surface of the tubular body.

According to the structure mentioned above, the package body can be easily opened at an optional position of the area to be opened in the spiral shape, and the formation of such spiral opening area can be easily done in comparison with the case of a fine tape being provided along the heat seal portion.

In the preferred structure, the area to be opened is composed of a plurality of linear portions extending obliquely with equal distance therebetween when the packing film is cut into a rectangular shape having a predetermined dimension in a manner such that a crossing point of an upper edge of one linear portion and an inner edge portion of one side end portion to be bonded of the packing film and a crossing point of a lower edge of another linear portion adjacent to the first mentioned one linear portion and an inner edge portion of another side end portion to be bonded of the packing film are positioned on the same horizontal line on the rectangular packing film. Since the opening area extends in continuous spiral line, the package body can be easily opened.

In the above aspects, the coarse surface portions of the oriented plastic films may be provided by forming through holes or forming through holes and non-through holes to the oriented plastic films.

The nature and further characteristic features of the present invention will be made more clear by way of the preferred embodiments described hereunder with reference to the accompanying drawings.

DESCRIPTION OF THE PREFERRED EMBODIMENTS

The present invention will be described hereunder in detail with reference to the accompanying drawings mentioned above.

Figure 1:
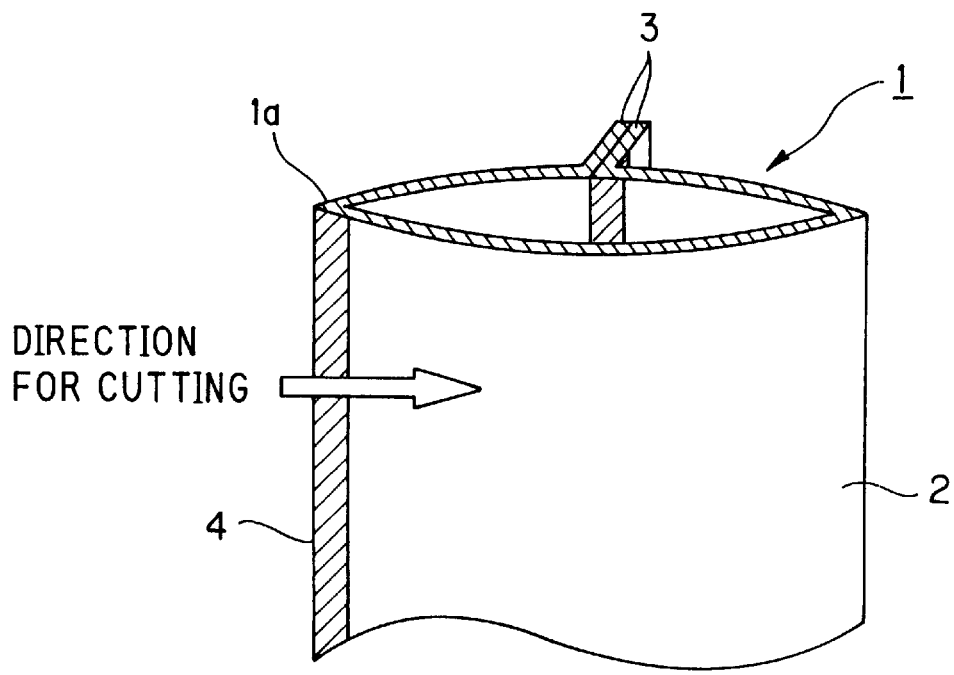
FIG. 1 is a perspective view, partially cut away, of a pillow-shaped packing bag which is manufactured by a packing film according to one embodiment of the present invention.

FIG. 1 shows a pillow-type packing bag 1 manufactured by using a packing (wrapping) film according to the present invention. The pillow-type packing bag 1 is formed by bending(or folding) a plastic laminate film 2 having a rectangular shape as a packing or wrapping film so that both side end portions of the laminate film 2 are overlapped as portions 3, 3 to be bonded so as to project outwardly at a central portion of a rear surface of the bag 1. The side end portions 3, 3 are then heat sealed as bonded portion 3 to thereby provide a tubular bag body and an opened end of the tubular body is then heat sealed. This heat sealing will be performed by a typically known seal-bar method, or another method such as ultrasonic seal method or high frequency seal method.

The plastic film 2 is composed of an oriented plastic film having an area coarsely formed as a coarse surface portion so that a portion at which the coarse surface portion is laminated constitutes an area to be opened (opening area, hereunder) of the plastic laminate film 2.

In the pillow-type packing bag 1 shown in FIG. 1, an opening area 4 is formed to a bent(or folded) portion 1a of the packing bag 1. According to the formation of such opening area 4, the packing bag 1 can be easily opened from the bent portion 1a without applying a strong force.

Figure 2:
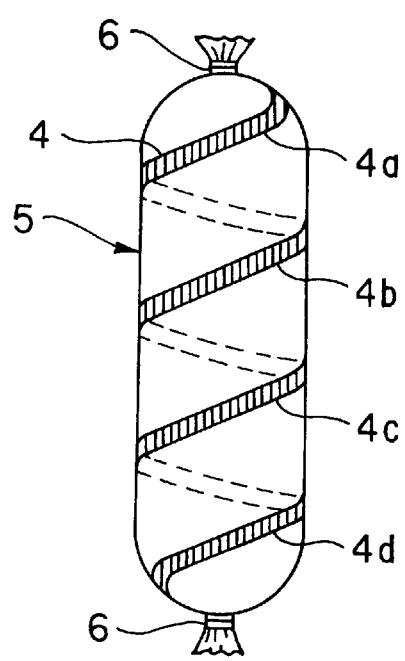
FIG. 2 is a perspective view of a tubular package body which is manufactured by a packing film according to the embodiment of the present invention.
Figure 3:
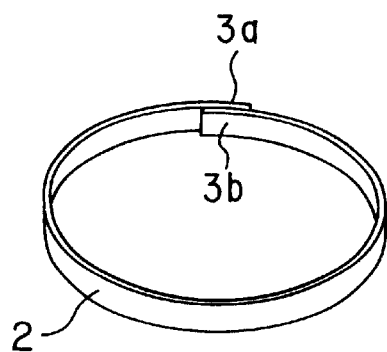
FIG. 3 is a perspective view of a partial body portion of the tubular package body.
Figure 4:
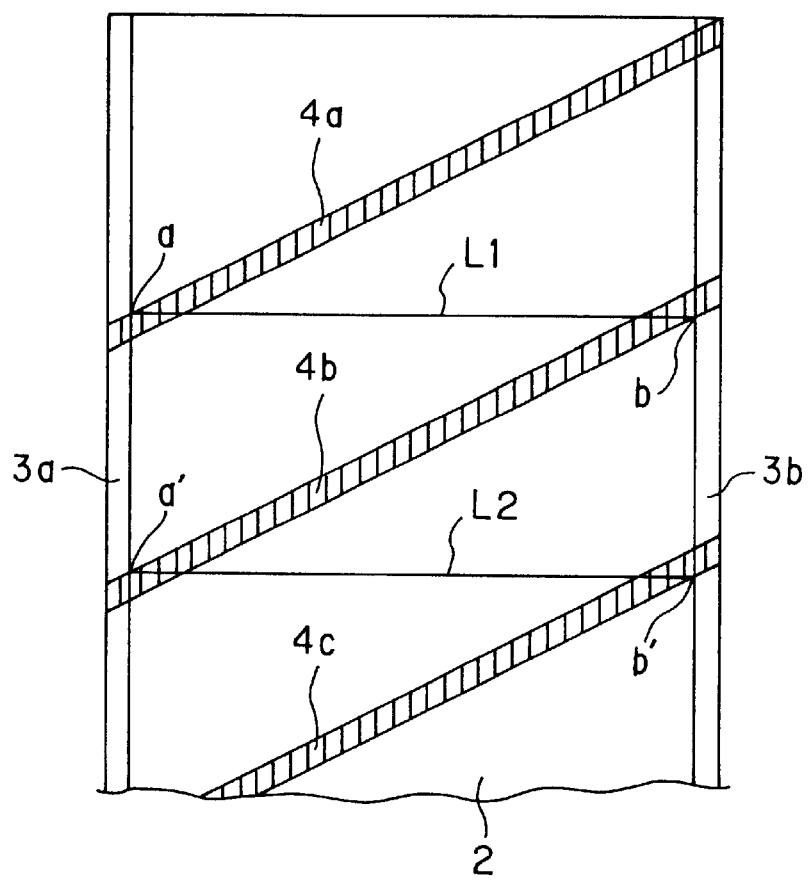
FIG. 4 is a developed view of the tubular package body (plastic laminate film), partially cut away.

FIG. 2 shows a tubular package body 5 according to the present invention, in which an opening area 4 having a fine width is formed to an outer peripheral wall of the tubular package body 5 so as to extend in a spiral shape from an upper end portion to a lower end portion thereof The tubular packing body 5 shown in FIG. 2 is formed from a plastic laminate film 2 cut in a rectangular shape as shown in FIG. 4 and both side ends 3a and 3b thereof are overlapped and then heat sealed so as to provide a tubular body portion as shown in FIG. 3. The rectangular plastic laminate film 2 is formed with a plurality of opening portions 4a, 4b, 4c, 4d (FIG. 2) each having a fine width and obliquely extending from one side end to the other side end of the film 2. An opening area 4 along which the tubular package body 5 is openable is formed by combining the opening portions 4a, 4b, 4c, 4d, respectively so that these opening portions form a continuous opening portion extending in a spiral shape when the rectangular plastic laminate film 2 is formed as a tubular body. The opened upper and lower end portions of the thus formed tubular body are closed by known fastening means such as clamping rings 6.

In order to provide the spiral continuous opening area 4 by connecting the opening portions 4a, 4b, 4c, 4d when the tubular body 5 is formed, it is necessary to cut the plastic laminate film 2 into a rectangular shape having a predetermined dimension such that a crossing point a of an upper edge of the first opening portion 4a and an inner.edge portion of a joining one side end portion 3a and a crossing point b of a lower edge of the second opening portion 4b, continuous to the first opening portion 4a, and an inner edge portion of a joining another side end portion 3b lies on the same transverse line L1, and in the like manner, a crossing point a' of an upper edge of the second opening portion 4b and an inner edge portion of the joining one side end portion 3a and a crossing point b' of a lower edge of the third opening portion 4c, continuous to the second opening portion 4b, and an inner edge portion of the joining another side end portion 3b lies on the same transverse line L2. According to such location of the fine opening portions 4a, 4b, 4c, 4d, when the rectangular plastic laminate film 2 is bent and joined so as to provide the tubular body 5, the adjacent opening portions are overlapped so as to form the continuous spiral opening area 4 having the fine width on the peripheral surface of the tubular package body.

When it is required to take out the inner content filling in the tubular package body 5 formed in the manner mentioned above, the inner content can be taken out by tearing a portion of the opening area 4 corresponding to the heat seal portion of the tubular body 5 and opening the tubular body 5 along the fine opening area 4 extending in the shape of continuous spiral on the outer peripheral surface of the tubular body 5.

According to the embodiment of the present invention, since the coarse surface of the spiral opening area 4 is protected by another laminated layer, there is substantially no degradation of the barrier performance due to the formation of the coarse surface portion, and accordingly, the content sealed in the tubular package body 5 cannot substantially be changed even in a long shelf life.

Figure 5:
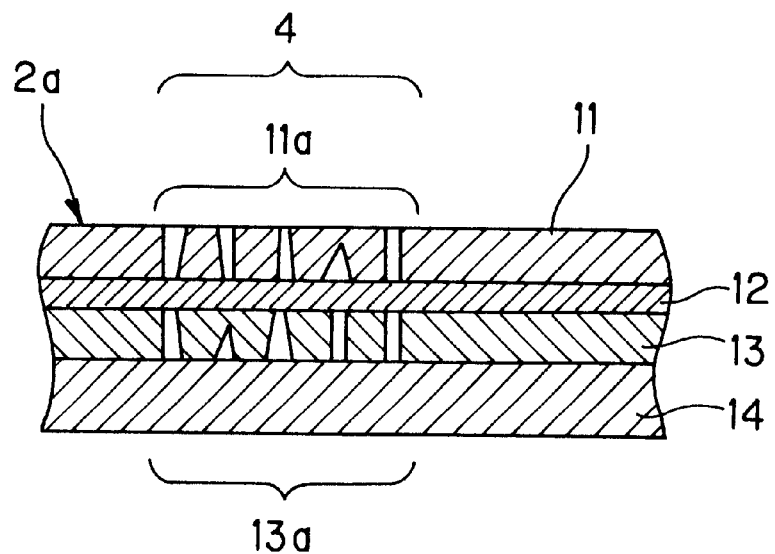
FIG. 5 is a schematic sectional view of a lamination layer structure of one example of the packing film according to the present invention.

One preferred example of such plastic laminate film 2 is shown in FIG. 5 as a sectional view of a plastic laminate film 2a. The plastic laminate film 2a has a four-layer structure which is composed of an oriented plastic film 11 provided with a coarse surface portion 11a having a thickness of 20 μm, an aluminum foil 12 having a thickness of 7 μm, another oriented plastic film 13 provided with a coarse surface portion 13a having a thickness of 20 μm, and a non-oriented plastic film 14 having a thickness of 40 μm, these four layers being laminated in this order from the upper side as viewed in FIG. 5. The oriented plastic film 11 positioned on the front(outside) surface side is formed of a material such as polyester such as polyethylene terephthalate or nylon, polypropylene, high density polyethylene or the like, which will be selected regardless of its polarity. The oriented plastic film 13 as an intermediate layer is composed of a non-polar film formed of a material such as polypropylene, high density polyethylene. The non-oriented plastic film 14 as an inner surface side layer is formed preferably of a material such as linear low density polyethylene, low density polyethylene, cast polypropylene, or the like.

In order to enhance the bonding performance or strength of the respective plastic film layers of the plastic laminate film, a corona treatment will be effected on the surfaces to be bonded of the plastic films. That is, the surfaces of the intermediate oriented plastic film layer 13 contacting to the aluminum foil layer 12 and the non-oriented plastic film 14 may, for example, be subjected to the corona treatment, or the surface of the non-oriented plastic film 14 contacting to the intermediate oriented plastic film 13 may be effected with the corona treatment.

Figure 6:
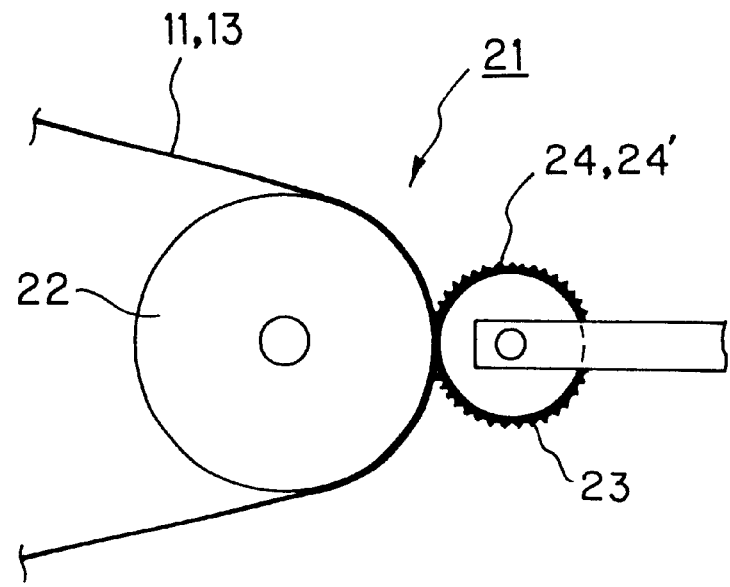
FIG. 6 is an illustration of a coarse surface forming device utilized for the present invention.

The coarse surface portions 11a and 13a of the oriented plastic films 11 and 13 can be formed by a coarse surface forming apparatus 21, for example, shown in FIG. 6.

With reference to FIG. 6, the coarse surface forming apparatus comprises a metal roll 22, a coarse surface forming roll 23 elastically contacting the metal roll 22 by means of spring, not shown, and a sand paper 24, grading number of 100, wound up around the coarse surface forming roll 23. Accordingly, when the oriented plastic films 11 and 13 pass through the gap between the metal roll 22 and the coarse surface forming roll 23 in a state that the sand paper 24 wound up around the roll 23 contacts the oriented plastic films 11 and 13 under pressure, the coarse surface portions 11a and 13a having through holes and non-through holes corresponding to the grading of the sand paper 24 are formed. The sizes of the through holes and non-through holes of the coarse surface portions 11a and 13a can be changed by changing the grading of the sand paper 24 to, for example, grading number of 120 or 80 from 100.

The coarse surface portions 11a and 13a may be formed by utilizing laser, ultrasonic or the like means.

As mentioned above, the respective coarse surface portions 11a and 13a are formed by the coarse surface forming apparatus 21 with the through holes and non-through holes. After the formation of the coarse surface portions 11a and 13a, the oriented plastic films 11 and 13 are laminated. The coarse surface portions 11a and 13a of these plastic film layers are opposed to each other with the aluminum foil layer 12 being interposed therebetween and the opening area 4 is formed by the intrusion of a plastic material as a binder(or adhesive) into at least the through holes. This binder is used for bonding the oriented plastic films 11 and 13 to the aluminum foil 12.

A print may be effected to the outer surface side oriented plastic film 11 before or after the formation of the coarse surface portion 11a. Although such printing process or a lamination process may be carried out independently from the coarse surface forming process, these processes may be performed substantially at the same time through an inline process by incorporating these printing and lamination processes into a continuous line together with the coarse surface forming process.

With reference to FIG. 1, when the packing bag 1 is formed by bending or folding the plastic laminate film 2, the opening area 4 is positioned to the bent portion 1a of the packing bag 1 and this opening area 4 serves as an opening starting portion at a time of tearing the bent portion 1a of the packing bag 1.

Referring to FIG. 5, the opening area 4 formed to the plastic laminate film 2a is formed by the intrusion of the plastic material as the binder into at least the through holes formed in the coarse surface portion 11a of the oriented plastic film 11 and into at least the through holes formed to the coarse surface portion 13a of the oriented plastic film 13. According to the structure of the present invention, however, because the plastic material as the binder is intruded into the through holes formed to the coarse surface portion 13a of the intermediate oriented plastic film 13 from both the sides of the aluminum foil 12 and the non-oriented plastic film 14, the inner portions of the through holes of the coarse surface portion 13a of the oriented plastic film 13 are formed as non-bonded portions in the case of the non-polar film, so that the tearing performance of the opening area 4 can be increased.

When the pillow-type packing bag 1 such as shown in FIG. 1 is manufactured by using the plastic laminate film 2a, the plastic laminate film 2a is first cut into a rectangular shape corresponding to the packing bag 1 as a product. Then, the cut plastic laminate film 2a is positioned such that the opening area 4 straddles at least a portion of the bent portion 1a of the packing bag 1 and the side end portions 3, 3 to be bonded together are bent so as to abut against each other at the central portion of the rear surface side of the packing bag 1. The thus projected end portions 3, 3 are heat sealed to thereby form a tubular bag body having opened ends which are then heat sealed. According to the manner mentioned above, the pillow-type packing bag 1 is formed.

When it is required to take out the inner content sealed in the pillow-type packing bag 1, the bag 1 is opened in a direction indicated by an arrow (direction for cutting in FIG. 1). In this cut opening operation, the opening area 4 formed to the bent portion 1a serves as the opening starting portion. The plastic laminate film 2a can be easily torn or broken by hands with no strong force because of the formation of the opening area 4 in spite of the lamination of the oriented plastic film layers on both the surface sides of the aluminum foil. In addition to the improved tearing performance due to the formation of the opening area 4, since the binder is intruded into the through holes of the coarse surface portion 13a of the oriented plastic film 13 constituting the opening area 4 from both surface sides thereof, the barrier performance can be also achieved.

Figure 7:
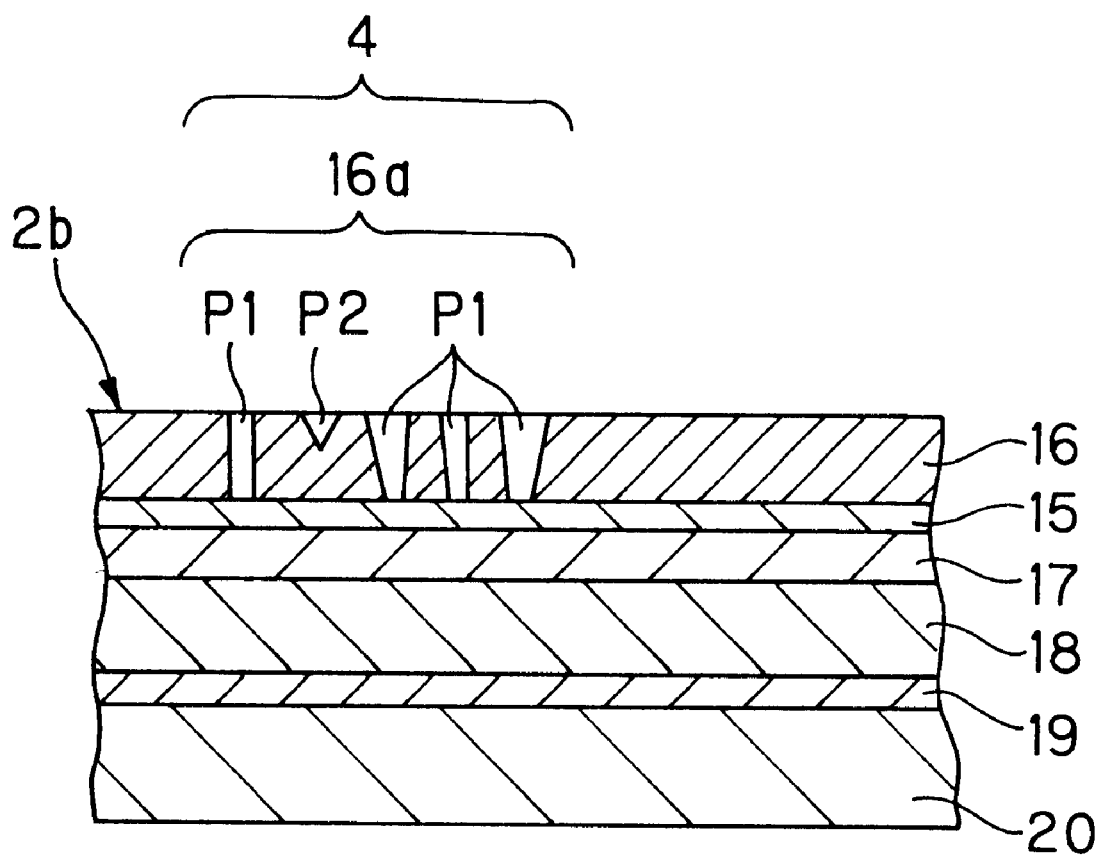
FIG. 7 is a schematic sectional view of a lamination layer structure of another example of the packing film according to the present invention.

FIG. 7 represents another example (2b) of the plastic laminate film. The plastic laminate film 2b of this embodiment has a three-layer structure composed of a biaxially oriented polyester film 16 which is typically formed of polyethylene terephthalate, an aluminum foil 18 and a non-oriented olefin film 20.

The biaxially oriented polyester film 16 has a thickness of 12 μm, formed at its rear surface with a printed layer 15 and provided with a coarse surface portion 16a having a predetermined width. The aluminum foil 18 has a thickness of 7 μm and bonded to the surface, having the printed layer 15, of the biaxially oriented polyester film 16 through a binder layer 17. The non-oriented olefin film 20 has a thickness of 50 μm and bonded to the surface of the aluminum foil through a binder layer 19. The non-oriented olefin film 20 may be bonded through an extrusion lamination means.

According to the structure mentioned above, the printed layer 15 is formed in a portion corresponding to the entire rear surface of the biaxially oriented polyester film 16 or in a portion corresponding to at least the coarse surface portion 16a thereof Accordingly, when the biaxially oriented polyester film 16 and the aluminum foil 18 are laminated through the binder layer 17, the binder component of the binder layer 17 is prevented from intruding into the through holes formed in the coarse surface portion 16a, causing no leaking on the surface of the biaxially oriented polyester film 16. The print layer 15 may be composed of a solid color plastic film, and when the solid color plastic film is applied, it is preferred to apply it on the entire rear surface of the biaxially oriented polyester film 16.

As the binder of the binder layer 17, when an isocyanate binder having a large amount of solid components, preferably containing the solid components in an amount of 30–60 weight % is used, the binder can hardly leak on the surface of the biaxially oriented polyester film 16 without backing the same with the print layer 15. However, the leaking of the binder on the surface of the biaxially oriented polyester film 16 can be substantially perfectly prevented by backing the polyester film 16 with the print layer 15. Further, the use of a solventless binder as the binder of the binder layer 17 may also prevent the binder component from leaking on the surface of the biaxially oriented polyester film 16.

Furthermore, the biaxially oriented polyester film 16 may be replaced with a film composed of a material such as nylon, polypropylene, high density polyethylene or the like. In order to increase the bonding performance of the respective plastic films constituting the plastic laminate film 2b, it is preferred to effect a corona treatment to the bonding surfaces of the plastic films. That is, the corona treatment will be effected to the surface of the biaxially oriented polyester film 16 contacting the aluminum foil 18 and the surface of the nonoriented olefin film 20 contacting the aluminum foil 18.

The coarse surface portion 16a having the predetermined width of the biaxially oriented polyester film 16 will be formed by using the coarse surface forming apparatus 21 shown in FIG. 6.

That is, with reference to FIG. 6, at a time when the biaxially oriented polyester film 16 passes through the gap between the metal roll 22 and the coarse surface forming roll 23, the surface of the polyester film 16 opposite to the surface on which the print layer 15 is to be formed is pressed against the sand paper 24 having grading number 120 wound up around the coarse surface forming roll 23 to thereby form the coarse surface portion 16a, with the predetermined width, formed with through holes P1 and non-through holes P2 corresponding to the grading number 120 of the sand paper 24. The-sizes of the through holes P1 and non-through holes P2 of the coarse surface portion 16a can be changed by changing the grading of the sand paper 24 wound up around the coarse surface forming roll 23 to, for example, grading number of 200 or 80 from 120.

In the case of forming the laminate plastic film 2b of three-layer structure composed of the biaxially oriented polyester film 16, the aluminum foil 18 and the non-oriented olefin film 20, which are laminated through the binder layers 17 and 19, the coarse surface portion 16a formed to the biaxially oriented polyester film 16 serves as the opening area 4 of the laminate plastic film 2b. The tearing performance of the opening area 4 of the laminate plastic film 2b is decided by the thickness of the biaxially oriented polyester film 16 and the sizes of the through holes P1 and non-through holes P2 formed to the coarse surface portion 16a of the polyester film 16.

According to experiments performed by the applicant, it was preferred to selectively use the sand paper having the grading number within 100 to 200 in the ease where the biaxially oriented polyester film 16 to be laminated to the plastic laminate film 2b has a thickness of 12 μm, to selectively use the sand paper having the grading number within 80 to 160 in the case where the biaxially oriented polyester film 16 has a thickness of 20 μm, and to selectively use the sand paper having the grading number within 60 to 120 in the case where the biaxially oriented polyester film 16 has a thickness of 30 μm.

Furthermore, according to the experiments, in the laminating process of the biaxially oriented polyester film 16 formed with the coarse surface portion 16a to the aluminum foil 18 through the binder layer 17, when a thin film layer was formed to the back surface of the polyester film 16, it could be prevented to leak the binder component of the binder layer 17 on the surface of the polyester film 16 through the through holes P1 formed in, the coarse surface portion 16a thereof. However, in the case of no formation of such thin film layer, the binder component leaked on the surface of the polyester film 16 through the through holes P1 formed to the coarse surface portion 16a.

Further, when the biaxially oriented polyester film 16 formed with the coarse surface portion 16a is laminated to the aluminum foil 18 through the binder layer 17, a binder prepared by dissolving an isocyanate binder of the binder layer may contain a large amount of solid components, preferably of 30–60 weight %, and more preferably of about 45 weight %. It was found through the experiments that, when the binder having a large amount of solid components was used, the leakage of the binder component of the binder layer 17 on the surface of the polyester film 16 through the through holes P1 formed to the coarse surface portion 16a could be prevented even in the case of no formation of the thin film layer to the back surface of the biaxially oriented polyester film 16.

The packing bag 1 provided with the opening starting portion according to the present invention can be formed by working the thus prepared plastic laminate film 2b by the manner mentioned above with reference to the plastic laminate film 2a and then bending the same along the bent portion 1a.

In the above embodiment, although there was described the plastic laminate film 2b having the three-layer structure of the oriented plastic film, the aluminum foil and the non-oriented plastic film as materials suitable for the formation of the retort food packing bag or the like, when the plastic laminate film is used for forming a packing bag for long time reservation, it may be composed of three-layer structure of the oriented plastic film, the paper sheet and the non-oriented plastic film.

The packing bag and the package body formed by the plastic laminate film 2b can be easily torn, as like the plastic laminate film 2a, with no strong tearing force. In addition, since the binder does not leak on the front (outside) surface of the plastic laminate film 2b, a good appearance as a packing bag or package body can be provided as well as no contamination to the guide roller and no causing of the blocking phenomenon.

It is to be noted that the present invention is not limited to the described embodiments and many other changes and modifications may be made without departing from the scopes of the appended claims.

What is claimed is:

1. A packing film comprising:
   a first oriented plastic film formed as a first surface layer and provided with a first coarse surface portion;
   an aluminum foil formed as a first intermediate layer;
   a second oriented plastic film of a non-polar plastic material formed as a second intermediate layer and provided with a second coarse surface portion that is formed with a through hole and is to be overlapped with the first coarse portion of the first oriented plastic film when laminated, the second intermediate layer formed of a linear low density polyethylene, low density polyethylene, or polypropylene film; and
   a non-oriented plastic film formed as a second surface layer that is bonded through a binder layer,
   wherein (1) said first oriented film, said aluminum foil, said second oriented plastic film and said non-oriented plastic film are laminated in this order so as to provide a laminated multi-layer structure, (2) an overlapped area of said first and second coarse surface portions constitutes an area to be opened, and (3) said first oriented plastic film is laminated to the aluminum foil through an isocyanate binder having a solid component of 30 to 60 weight %.

2. A packing film according to claim 1, wherein said coarse surface portions of the oriented plastic films are provided by forming through holes or forming through holes and non-through holes to the oriented plastic films.

3. A packing film comprising:
   an oriented plastic film formed as a first surface layer and provided with a coarse surface, portion having a through hole therein;
   an aluminum foil formed as an intermediate layer; and
   a non-oriented plastic film formed as a second surface layer that is bonded through a binder layer,
   wherein said oriented plastic film, said aluminum foil and said non-oriented plastic film are laminated in this order so as to provide a multi-layer structure, and
   wherein said oriented plastic film is laminated to the aluminum foil through an isocyanate binder having a solid component of 30 to 60 weight % and said coarse surface portion constitutes an area to be opened.

4. A packing film according to claim 3, wherein said coarse surface portion of the oriented plastic film is provided by forming through holes or forming through holes and non-through holes to the oriented plastic film.

5. A packing bag that is formed by folding a rectangular packing film into a tubular body, heat sealing side end portions of the folded packing film as a bonded side portion of the tubular body and heat sealing both end openings of the tubular body,
   wherein said packing film is composed of an oriented plastic film formed as a first surface layer and provided with a coarse surface portion having a through hole therein, an aluminum foil formed as an intermediate layer, and a non-oriented plastic film formed as a second surface layer that is bonded through a binder layer,
   wherein said oriented plastic film, said aluminum foil and said non-oriented plastic film are laminated in this order so as to provide a multi-layer structure so that the non-oriented plastic film constitutes an inner surface layer formed as the tubular body, and
   wherein said oriented plastic film is laminated to the aluminum foil through an isocyanate binder having a solid component of 30 to 60 weight %, said coarse surface portion constitutes an area to be opened, and said area to be opened is positioned at a folded portion of the tubular body.

6. A packing bag according to claim 5, wherein said oriented plastic film has a surface facing the intermediate layer, said surface being subjected to a corona treatment.

7. A packing bag according to claim 5, wherein said non-oriented plastic film has a surface facing the intermediate layer, said surface being subjected to a corona treatment.

8. A package body formed by bending a rectangular packing film having a predetermined dimension so as to provide a tubular body, heat sealing both side end portions of the bent packing film as a bonded side portion and closing both end opening portions of the tubular body,
   wherein said packing film is composed of an oriented plastic film formed as a first surface layer and provided with a coarse surface portion having a through hole therein, an aluminum foil formed as an intermediate layer, and a non-oriented plastic film formed as a second surface layer that is bonded through a binder layer,
   wherein said oriented plastic film, said aluminum foil and said non-oriented plastic film are laminated in this order so as to provide a multi-layer structure so that said non-oriented plastic film constitutes an inner surface layer when formed as a tubular body, and
   wherein said oriented plastic film is laminated to the aluminum foil through an isocyanate a binder having a solid component of 30 to 60 weight %, said coarse surface portion constitutes an area to be opened so as to extend in a linear spiral shape on an outer surface of the tubular body.

9. A package/body according to claim 8, wherein said area to be opened is composed of a plurality of linear portions extending obliquely with equal distance therebetween when said packing film is cut into a rectangular shape having a predetermined dimension in a manner such that a crossing point of an upper edge of one linear portion and an inner edge portion of one side end portion to be bonded of the packing film and a crossing point of a lower edge of another linear portion adjacent to the first mentioned one linear portion and an inner edge portion of another side end portion to be bonded of the packing film are positioned on a same horizontal line on the rectangular packing film.

* * * * *